AUTOMATIC CHANNEL SELECTOR FOR COMMUNICATION SYSTEMS

Filed Oct. 10, 1962 2 Sheets-Sheet 1

INVENTORS
Robert W. Fleissner
BY & Franklin E. Walker
Warren D. Hill
ATTORNEY

AUTOMATIC CHANNEL SELECTOR FOR COMMUNICATION SYSTEMS

Filed Oct. 10, 1962 2 Sheets-Sheet 2

INVENTORS
Robert W. Fleissner,
BY & Franklin E. Walker
Warren D. Hill
ATTORNEY 3,268,664
AUTOMATIC CHANNEL SELECTOR FOR COMMUNICATION SYSTEMS Robert W. Fleissner, Kokomo, Ind., and Franklin E. Walker, Menomonee Falls, Wis., assignors to General Motors Corporation, Detroit, Mich., a corporation of Delaware Filed Oct. 10, 1962, Ser. No. 229,624
10 Claims. (Cl. 179—15)

This invention relates to a channel selector for communication systems and, more particularly, to an automatic channel selector for radiotelephones.

In communication and control systems with multiple receiving stations, it is a usual practice to utilize common circuits or carrier frequencies for all stations and to employ distinctive call signals for selecting a particular station. In a conventional system the call signals, much like the well known dial telephone numbers, are represented by different permutations of a group of integers, such as 2 through 10. Typically, a call signal is formed by taking five integers at a time, such as 5–3–2–7–4, to permit a very large number of stations to be selectively operated in the same network.

For transmission, the call signals are encoded by successively alternating an electrical signal between two given frequencies with a number of alternations or transitions corresponding to the value of the call signal integer and with a prolonged delay or space between transitions to separate the integer signals. In both wired circuit networks and radio networks, the call signal is encoded by alternate 600 c.p.s. and 1500 c.p.s. tone frequencies with a frequency transition at approximately every 100 milliseconds within an integer signal and a space or approximately 500 milliseconds between successive integer signals. At the receiving station, the call signals are decoded by an electromechanical decoding or selector devivce responsive to successive trains of electrical pulses, each train corresponding to an integer signal. The decoding device then compares the incoming call signal to the call number assigned to that particular receiving station and, if the call signal is identical to the assigned call number, finally actuates an alarm to signify receipt of a call.

In previously known systems it has been customary to employ a single channel using a single frequency for transmitting and receiving or using dual frequencies, one for transmitting and the other for receiving. In either case, where there are a plurality of transmitting and receiving stations, only one pair of stations could use the system at any given time. Accordingly, it is desirable to provide a multiple channel system to provide more comprehensive service.

It has been proposed to use a multiple channel system wherein one channel, called the ringing channel, is utilized solely to transmit the distinctive call signals for selecting a particular receiving station while the remaining several channels, called the message channels, are used for transmitting voices or other communication signals. This system raises the obvious problem of providing a practical means of keeping the receiver station tuned to the ringing channel until a call signal for the station is received and then tuning the receiver station to the particular message channel which will be used by the transmitter station to send the message.

It is then an object of the present invention to provide a means of indicating at the receiving station which message channel has been selected to carry the message, and it is a further object to provide a means to automatically tune the receiving station to the selected message channel.

In order to carry out the invention, it is contemplated that the call signals include not only a series of digits peculiar to the call station, but to include one additional digit to designate the selected channel. The receiving station is equipped with a channel selector which is energized when the call number for that station has been received and includes a selecting switch and associated circuitry which is adapted to condition the selecting switch in accordance with the number of pulses in the channel designating digit. The transmitting and receiving oscillators of the receiving station are tuned to the designated channel in accordance with the condition of the selecting switch. In one aspect of the invention, further means are provided to give a visual and/or audible indication that an incoming call is being received.

The above and other advantages will be made more apparent from the following specification taken in conjunction with the accompanying drawing in which.

The following brief description of a selective ringing decoding system is intended only to set forth the environment of the present invention. A more detailed description of such a system may be found in the copending applications of Malone et al. Serial No. 799,650, filed March 16, 1959, now Patent No. 3,077,577, and Malone Serial No. 158,709, filed December 12, 1961, now Patent No. 3,226,679, which are assigned to the same assignee as the present invention. While the channel selector described herein may be used with the systems described in these applications, it may be used in other systems as well.

Figure 1:
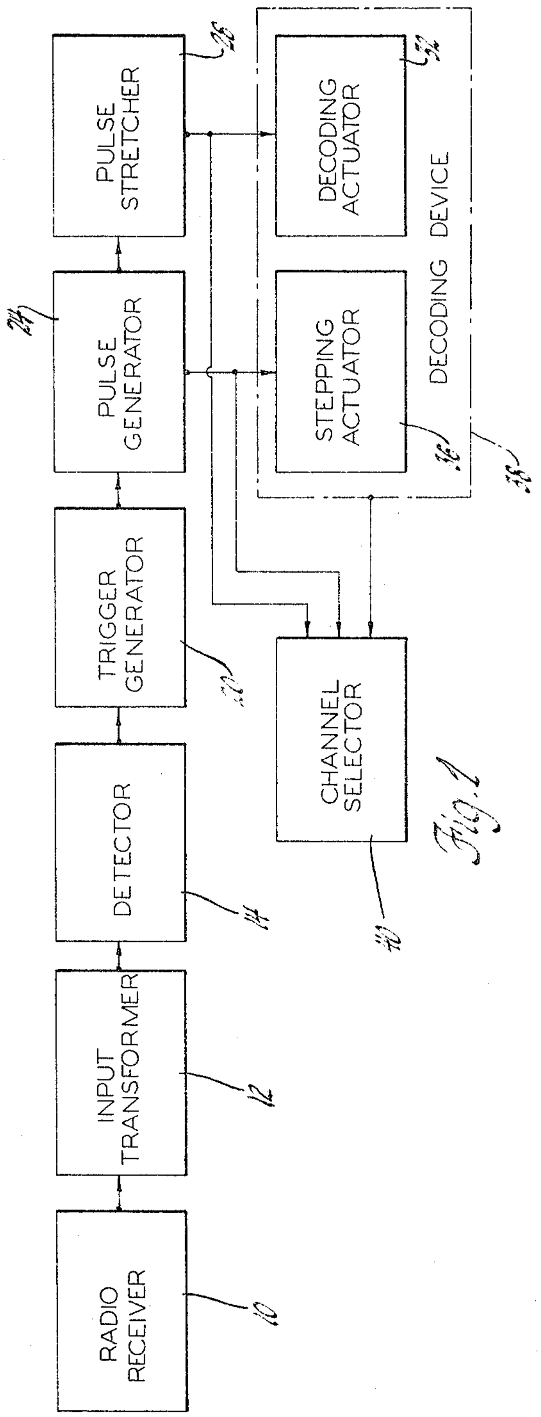
FIGURE 1 is a block diagram of a radiotelephone receiver including a channel selector according to the invention.

Referring now to FIGURE 1, there is shown an illustrative embodiment of the invention in a decoder system adapted to receive call signals in the form of tone frequency transitions and to translate the call signals to pulse form for driving a decoding device. It will be appreciated as the description proceeds that the invention is equally applicable to either radio or wired circuit networks wherein the call signal is transmitted as successive frequency transitions between any two frequency values.

In FIGURE 1, a radio receiver 10, suitably a frequency modulation receiver, is tunable to a carrier wave frequency common to other receivers with similar decoder systems in the same network. To alert the operator of the radio receiver to a forthcoming message transmission, the network utilizes selective ringing wherein each receiver is assigned a call signal represented by a permutation of integers. For simplifying the explanation, it will be assumed that the call signal assigned to this particular receiver is represented by a group of three integers 5–3–4 although the number of integers taken at a time may vary, depending upon the number of receiver stations to be employed in the network. For example, it is a common practice to form the call signals by taking five integers at a time from the group of 2 through 10 in which case the number of usable permutations, and hence the number of receiver stations in the same network which may be selectively called, exceeds 50,000. In such systems, the integer 1 is reserved for use as a clearing signal whereby all of the decoder systems in the network are reset after each call signal transmission for reception of a succeeding call signal. The transmitter station in such a network may be of conventional type and the call signal is encoded for transmission by modulating the carrier wave with a succession of tone frequency transitions, conventionally 600 c.p.s. and 1500 c.p.s. with a number of tone transitions corresponding to the value of the particular integer in the call signal.

Figure 2:
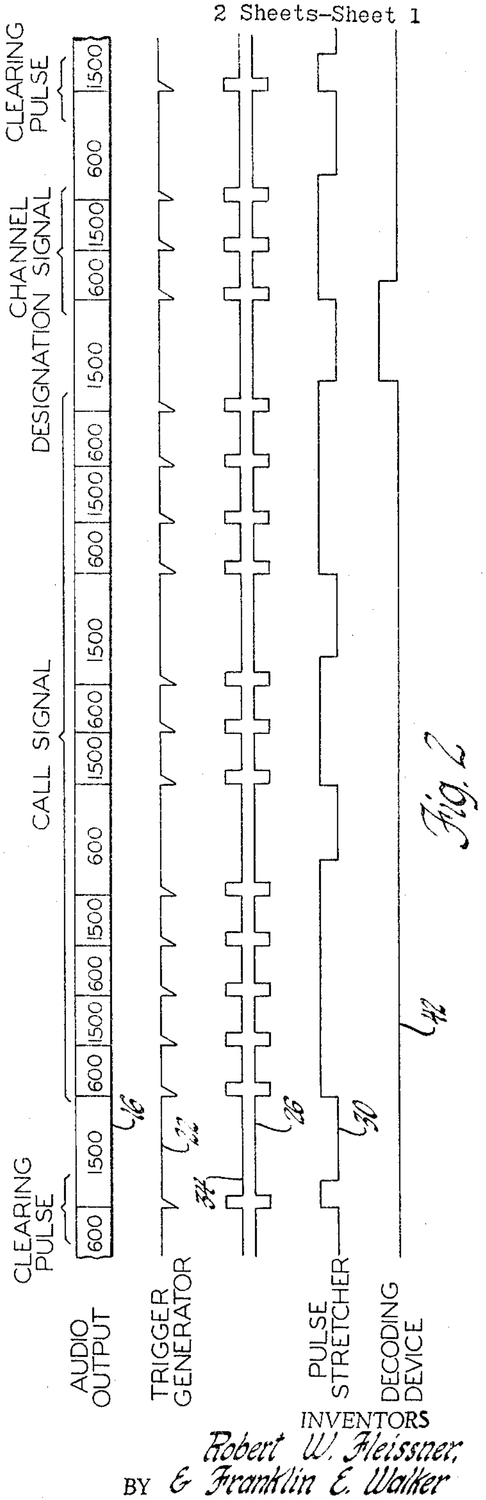
FIGURE 2 is a graphical representation of electrical signals at selected points of the receiver of FIGURE 1.

During the reception of a call signal, the audio output voltage of the receiver 10 alternates between the 600 c.p.s. and the 1500 c.p.s. tones as shown in the block diagram 16 of FIGURE 2. In the call signal, which is illustrated as 5–3–4, the tone frequency within each integer signal changes about every 100 milliseconds. The tone voltage is applied through an input stage or transformer 12 to a frequency selective detector stage 14 which develops an output current of one polarity when the 600 cycle tone predominates and of the other polarity when the 15000 cycle tone predominates, and thus, a polarity change occurs at each tone frequency transition. The detector signal is applied to a trigger generator 20 which develops a voltage of rectangular waveform between adjacent tone frequency transitions from which is developed trigger pulses having a waveform 22 and corresponding to each tone frequency transition. The trigger pulses are applied to a pulse generator 24 which develops a pulse corresponding to each trigger pulse to produce a pulse train, represented by waveform 26, for each integer signal. The integer signal pulse trains are applied to a pulse stretcher circuit 28 which develops pulses of waveform 30 extending through each integer signal which are applied to a decoding actuator 32. The pulse generator 24 also produces a second integer pulse train 34 which is opposite in polarity to the pulse train 26 and is applied to a stepping actuator 36.

As best described in S.N. 799,650, the stepping actuator and decoding actuator in part make up a decoding device 38 and serve to rotate a mechanical code wheel. When the correct call signal has been received and applied to the decoding device 38, a pair of acquisition contacts 74 (FIGURE 3) are closed to send a signal to the channel selector 40. As shown in waveform 42 in FIGURE 2, the acquisition contacts remain closed until another pulse is received. In previous systems these contacts were denoted as ringing contacts since they had the effect of energizing the telephone alarm. In accordance with the present invention, however, the alarm will not be sounded until the designated channel has been made ready for service. Signals from the pulse generator 24 and pulse stretcher 28, as shown in waveforms 30 and 34, are also applied to the channel selector 40.

Figure 3:
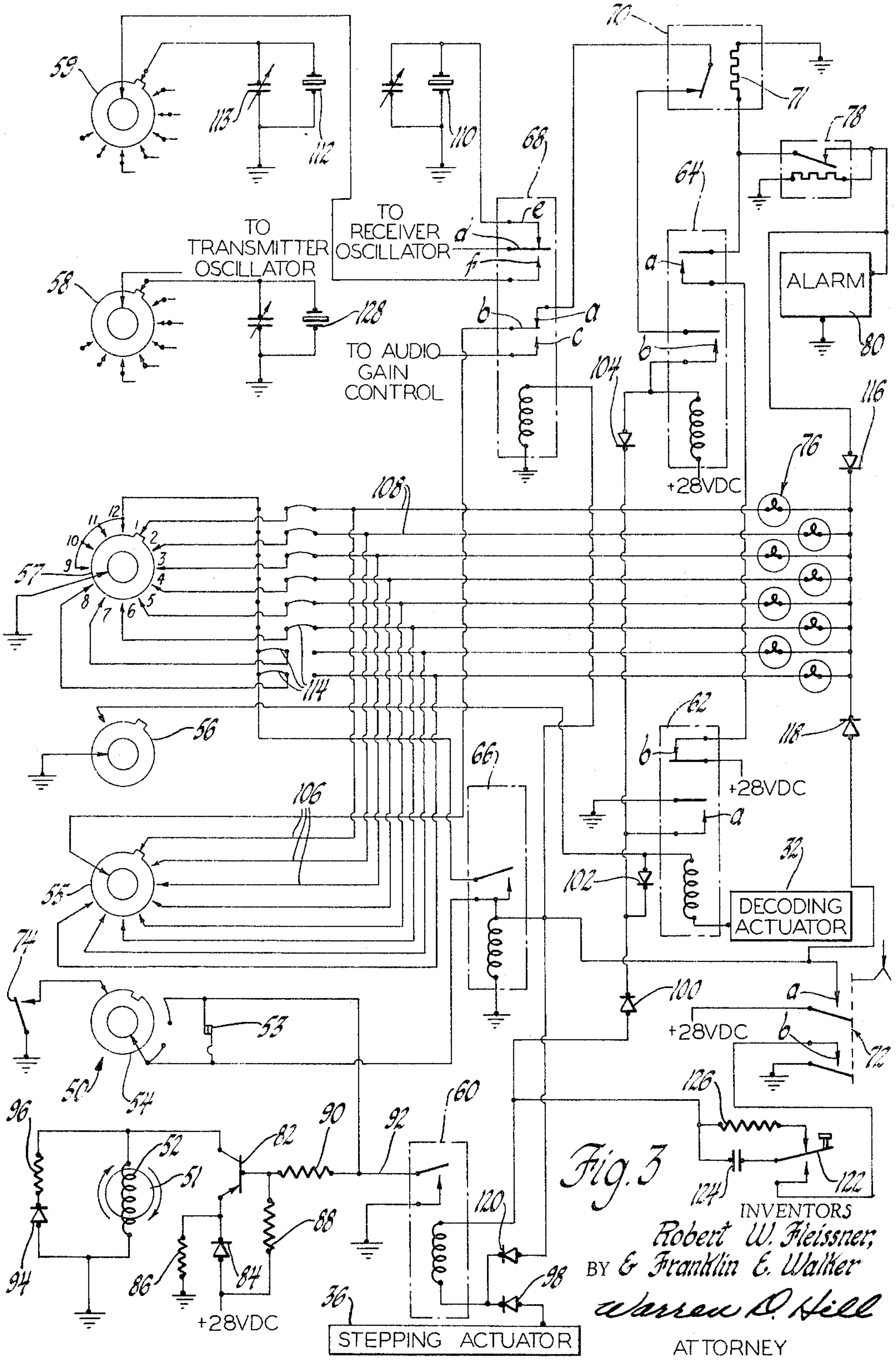
FIGURE 3 is a schematic diagram of the channel selector circuit according to the invention.

The channel selector shown in FIGURE 3 includes a stepper switch 50 controlled by circuitry which contains a pulsing relay 60, an index relay 62, a control relay 64, a skip relay 66, a hook switch relay or tuning relay 68, a time delay relay 70, a hook switch 72, decoder acquisition contacts 74 connected to ground, channel indicator lights 76, a flasher 78, and an audible alarm 80 interconnected by conductors to be described. The stepper switch 50 is preferably of the type known commercially as a Ledex switch. It comprises a rotating armature 51, a driving coil 52 for the armature, a pair of normally closed interrupter contacts 53 which are opened when the rotating armature 51 is moved to its extreme position upon energization of the driving coil 52, and a series of six rotary switch wafers 54 through 59 which are rotated together by the armature through a ratchet arrangement, not shown. The switch wafers have twelve stable positions. When a driving pulse is applied to the driving coil 52 and the armature 51 is rotated, the wafers are stepped one position in the clockwise direction. Each wafer comprises a conductor having an inner slip ring in contact with a stationary contact as shown, and has either a projecting finger or an indentation formed in the outer periphery of the wafer to make or break contact with from one to twelve stationary contacts disposed around the periphery of each wafer. As indicated on the drawing of wafer 57 the switch positions may be, for the purposes of description, numbered from 1 to 12, the first eight of which positions correspond with the message channels available for selection. Position 11 of the switch is denoted as the "ready" position.

In the embodiment shown, positions 1 through 6 are to be equipped with crystals which determine the frequencies of the receiver and transmitter for each channel. Wafer 59, for example, is connected through its inner slip ring and corresponding stationary contact and through the relay 68 to the receiver oscillator grid, while the stationary peripheral contacts for positions 1 through 6 are connected to crystals 112. For convenience only the crystal 112 for position 1 is illustrated. A trimming capacitor 113 is placed in parallel with each crystal 112 to provide fine tuning of the oscillator. Similarly, wafer 58 has its inner slip ring connected to the transmitter oscillator grid and the stationary peripheral contacts for positions 1 through 6 are each connected to a crystal 128. Thus the circuit is equipped for operation on channels 1 through 6. Channels 7 and 8, however, may be similarly equipped by adding crystals to the corresponding switch positions and by making another circuit alteration to be described.

A transistorized driving circuit for the switch 50 includes a switching transistor 82 having an emitter connected through a diode 84 to a 28-volt D.C. source. The emitter is also connected to ground through a bleed resistor 86. The transistor base is connected through a biasing resistor 88 to the 28-volt source and through a third resistor 90 to a conductor 92, while the collector is placed in series with the driving coil 52. A pulse absorbing diode 94 and resistor 96 are connected across the coil 52. When no ground potential is applied to the conductor 92 the transistor 82 will be nonconducting. A small current will pass from the 28-volt source through the diode 84 and the resistor 86 to create a small voltage drop across diode 84. Further, 28 volts are applied to the base through resistor 88. This ensures that the emitter voltage is lower than the base voltage thereby maintaining the transistor in a nonconductive state. When ground potential is applied to the conductor 92, emitter-base current will flow, an consequently, collector current will flow to energize the driving coil 52.

The first wafer 54 of the stepper switch has a notched periphery and a single peripheral contact which engages the wafer at all times except when the switch and the peripheral notch are in the "ready" position. This contact is connected to the decoder acquisition contacts 74 so that ground potential is applied to the wafer 54 whenever the acquisition contacts 74 are closed. The inner slip ring of the wafer 54 engages a stationary contact that is connected to the interrupter contacts 53 which in turn are connected to the conductor 92. With this arrangement, when the acquisition contacts 74 are closed and the switch is not in ready position, ground potential is applied through the wafer 54 and through the interrupter contacts 53 to the conductor 92 thereby causing the transistor 82 to conduct and to energize the driving coil 52. Upon clockwise rotation of the armature 51 the switch steps one position and the interrupter contacts are opened to effect de-energization of the driving coil 52, to permit the armature 51 to return to its initial position, and to permit closing of the interrupter contacts 53. Provided the switch is not at that time in "ready" position, the driving coil 52 will again be energized in the same manner so that the switch will be stepped in very rapid sequence until it reaches the "ready" position where the notch in the wafer 54 registers with the stationary peripheral contact and the circuit to ground is broken.

The pulsing relay 60 is connected through a diode 98 to the input of the stepping actuator 36 so that the pulse waveform 34 will be applied to the coil of relay 60. The other end of the relay coil is connected through a diode 100 to normally open contacts 62*a* on the index relay 62 which will provide a connection to ground when the index relay 62 is energized. The pulsing relay 60 has a pair of normally open contacts, one connected to ground and the other to the conductor 92. Thus when a pulse is permitted to pass through the coil of the pulsing relay 60, these contacts will momentarily close to apply ground potential to the conductor 92 and step the stepper switch one position.

The index relay 62 has one end of its coil connected to the input of the decoding actuator 32 to apply waveform 30 thereto while the other end of the coil is connected through a diode 102 to the aforementioned normally open ground contacts 62*a* and also being connected by an obvious circuit to ground through the switch wafer 56 provided the switch is in "ready" position. In addition to the normally open ground contacts 62*a*, the index relay includes a pair of normally closed contacts 62*b*, one of which is connected to the 28-volt source and the other of which is connected to one of the normally open contacts 64*a* of the control relay 64.

The coil of the control relay 64 has one end connected to the 28-volt source and the other end connected through a diode 104 to the normally open ground contacts 62*a* of the index relay so that the control 64 will be energized whenever the index relay 62 is energized. In addition, the control relay 64 may be grounded through a holding circuit which comprises its own normally open contacts 64*b*, the normally closed contacts of the time delay relay 70, a pair of normally closed contacts 68*a*, 68*b* of the hook switch relay, the wafer 55 of the stepper switch, and (providing the stepper switch is in an equipped channel position) through one of the pairs of conductors 106, 108 to the switch wafer 57 which is grounded.

The hook switch relay 68 includes a coil having one end grounded and the other end connectable to the 28-volt source through the normally open contacts 72*a* of the hook switch 72; that is, the hook switch relay 68 will be energized when the telephone handset is lifted from its cradle thereby closing the contacts 72*a* of the hook switch 72. The hook switch relay includes a stationary contact 68*a* and a movable contact 68*b* which were previously described in connection with the holding circuit of the control relay, and a further stationary contact 68*c* which may be engaged by the movable contact 68*b*. The latter stationary contact is connected to the receiver audio gain control and will be grounded through the switch wafers 55, 57, as described above, when the hook switch relay is energized. A second movable contact *d* controlled by the hook switch relay 68 is connected to the oscillator grid of receiver 10 and is movable between a pair of stationary contacts *e* and *f*, one of which is connected to an oscillator crystal 110 tuned to the frequency of the ringing channel and the other of which is connected to the switch wafer 59 for selective connection to the crystals 112 tuned to each of the message channels.

The channel indicating circuit includes the switch wafer 57 which has its stationary peripheral contacts for positions 1 through 6 each connected to a corresponding indicator lamp 76. Switch contacts for positions 7 and 8 likewise may be connected to indicator lamps 76 when those channels are equipped with crystals by changing the jumpers 114 to effect such a connection. However, as long as channels 7 and 8 are not so equipped, the jumpers are arranged to connect peripheral contacts of positions 7 and 8 to one contact of the skip relay 66. The peripheral contacts in positions 9 through 12 are permanently connected to the skip relay contact so that if the stepper switch is in one of the nonequipped positions 7–12 and the skip relay 66 is energized to close its contacts, then ground potential is applied from the switch wafer 57 to the interrupter contacts 53 thereby causing rapid sequence stepping of the switch until a channel equipped position is reached, i.e., position 1. The channel indicator circuit is energized from the 28-volt source by connection through the contacts 62*b* of the index relay, the contacts 64*a* of the control relay when closed, the flasher 78, a diode 116, a lamp 76, and the grounded wafer 57. Thus when the stepper switch is in one of the equipped channel positions 1–6 and the above-mentioned relay contacts 62*b* and 64*a* are closed, current will be supplied to an indicator light 76 corresponding to the selected channel. The current will be supplied intermittently due to the action of the flasher 78. An audible alarm 80 which may be, for example, a buzzer or bell, is also energized by the intermittent current from the flasher. A heating coil 71 in the time delay relay 70 is connected to the indicator circuit and will cause the opening of the time delay relay contacts after a predetermined period of signaling thus opening the holding circuit of the control relay and opening the contacts 64*a* to deenergize the indicator circuit.

As mentioned before, a hook switch 72 is provided which contains two pairs of contacts 72*a*, 72*b* which are open when the telephone handset is in its hung-up position and which are closed when the handset is lifted from the cradle either when answering or placing a call. One pair of contacts 72a when closed connects the 28-volt source to the skip relay 66 and the hook switch relay 68 and also connects the source through the diode 118 to the indicator lights 76 to provide steady indication of the channel which is tuned in at that time. The 28-volt source is also connected through contacts 72*a* and a diode 120 to the coil of the pulsing relay 60. The other pair of contacts 72b when closed applies ground potential to a manual channel selector circuit. This circuit includes a double throw push button switch 122 wherein the movable contact is connected through a capacitor 124 to the pulsing relay 60. The upper stationary contact is connected to a small resistor 126 which is in parallel with the capacitor 124 when the switch is in upper position and the lower contract is connected to ground through the hook switch contacts 72*b*. When the push button switch 122 is manually depressed a pulse of current passes from the power source through the contacts 72*a*, the pulsing relay 60, the capacitor 124, and the hook switch contacts 72*b* to ground. It has been found that when a 10 microfarad capacitor is used, this provides sufficient current to energize the pulsing relay 60 to effect the movement of the stepper switch through one position. When the push button switch 122 is released to return to its upper position the capacitor 124 is discharged through the parallel resistor 126.

In operation of the system, when an incoming call is received the receiver 10 is tuned to the ringing channel as it is always the case when the handset is in hung-up position since then the hook switch relay 68 is deenergized. Then the receiver is conditioned to receive the transmitted calling signals. Typically, the single pulse clearing signal is first given to assure that the decoding devices is in zero position. Then, as disclosed in FIGURE 2, the call signal is transmitted as a series of frequency alternations 16 which are transformed into a train of pulse groups 34. If the transmitted call signal coincides with that corresponding to the particular station of interest, e.g., 5–3–4, as shown in FIGUURE 2, then the acquisition contacts 74 are closed and the channel selector circuit comes into operation. When the acquisition contacts 74 are closed the transistor 82 will conduct and cause the stepper switch 50 to rotate to its starting or "ready" position. When the stepper switch is at its "ready" position the channel selection circuit is prepared to receive signals which correspond to the channel to be used. These signals are a series of 600 and 1500 cycle frequency alternations which are decoded by the decoder in the same manner as the three call number digits. The stepping and decoding actuator pulses 34 and 30 from the decoder 38 are applied to the pulsing relay 60 and the index relay 62, respectively. The low potential side of the coil of the index relay 62 is grounded through the switch wafer 56. This is possible only when the stepper switch 50 is in its "ready" position. The decoding actuator pulse 30 is applied to the high potential side of the index relay to energize the relay. The low potential side of the coil of the pulsing relay 60 is then grounded through the closed contacts 62*a* of the index relay 62 and the diode 100. The closed contacts 62*a* of the index relay also provide a holding circuit to ground through the diode 102. The stepping actuator pulses 34 from the decoder are applied to the high potential side of the pulsing relay 60 which becomes energized with each stepping pulse. Each time the pulsing relay is energized a ground path through its energized contacts is completed to the conductor 92. The stepper switch therefore steps one position for each stepping pulse from the decoder. It should be noted that upon receipt of the first pulse of the channel designation signal, the decoder acquisition contacts 74 are opened to remove ground potential from the interrupter contacts 53 thereby preventing automatic stepping of the switch. During the time that the index relay has been energized the ground path through its closed contacts 62*a* has been completed through the diode 104 to the low potential side of the coil of the control relay 64 which therefore is energized. The control relay 64 will remain energized as long as the holding circuit through the hook switch relay contacts 68*a*, 68*b* remains intact. At the end of the channel designation signal the stepper switch 50 has reached a position corresponding to the selected channel and the index relay 62 is deenergized. When the control relay 64 is energized and the index relay in deenergized a 28-volt path is completed through the closed contacts 62*b* and 64*a* on those relays and through the flasher to the alarm 80 and lamps 76. The flasher unit causes the alarm to operate much on the order of the ordinary home telephone. When the handset is lifted from its cradle the energizing of the hook switch relay 68 breaks the holding circuit to the control relay 64 and the audible signal stops. If the handset is not lifted within a predetermined period—say, 30 seconds—the time delay relay 70 operates to open the holding circuit. The stepper switch has rotated the wafers 58 and 59 to a position which connects the proper receiving crystals 112 and transmitting crystals 128 to the receiver and transmitter oscillators. The connection to the receiver oscillator, however, is made through the contacts 68*d*, 68*f* of the hook switch relay. Therefore the ringing channel crystal 110 remains connected to the receiver oscillator until the handset is lifted from the cradle.

When an operator at the receiving station wishes to originate a call he must select a channel by lifting the handset from the cradle and depressing and releasing the channel selector push button switch 122. Lifting the handset from the cradle applies 28 volts to the hook switch relay 68, to the skip relay 66, and to the pulsing relay 60. If the stepper switch is in a position corresponding to a nonequipped channel 7–12, then the closing of the skip relay contacts causes the stepper switch to rapidly step around to channel 1. Thereafter by operating the push button switch the radio unit may be sequentially tuned to the other channels until one is found on which the operator desires to place a call. Such a channel will be located by listening to the earphone of the handset and tuning to each channel until an unused channel is found. An indicating lamp 76 is illuminated for each channel manually selected. This assists the operator in selecting a specific channel if for some reason he has a perference. However, since the channel selector is automatic, usually the operator does not need to know which channel on which he is receiving or placing a call; consequently, the indicating lamps 76 may be eliminated from the circuit if desired.

It will thus be seen that this invention provides a means for automatically tuning the receiving station to a channel which has been selected at the transmitting station and, if desired, to also indicate a selected channel.

The embodiment of the invention described herein is for purposes of illustration and the scope of the invention is intended to be limited only by the following claims.

What is claimed is:

1. In a communication system having a calling channel and a plurality of message channels; a receiver having a decorder responsive to received signals for producing an acquisition signal followed by a group of pulses corresponding to a selected one of the message channels; means in the decoder for producing an elongated pulse extending at least throughout the duration of the group of pulses; a channel selector including a stepper switch having a drive means, means responsive to the acquisition signal connected with the stepper switch to move the stepper switch to ready position, an index relay connected with the decoder output energized by the elongated pulses, a pulsing relay connected to the decoder output and the index relay energized by the group of pulses only when the index relay is energized, contacts on the pulsing relay connected to the drive means for initiating movement of the stepper switch throughout one position each time the pulsing relay is energized to thereby move the stepper switch to a position corresponding to the selected message channel, a control relay connected to the index relay initially energized therethrough upon energization thereof, a time delay relay, a holding circuit for the control relay through the time delay relay and through the stepper switch when the stepper switch is in its message channel selection position, an indicating circuit energized upon termination of the elongated pulse comprising a circuit path through contacts of the energized control relay a channel indicating lamp and the stepper switch, the indicating circuit further energizing the time delay relay whereby after a predetermined period of operation of the indicator circuit the time delay relay will open the holding circuit to deenergize the channel selector, a manually controlled hook switch, a hook switch relay in circuit with the hook switch energized upon closing of the hook switch, and contacts on the hook switch relay effecting tuning of the receiver to the calling channel when the hook switch relay is deenergized and effecting tuning of the receiver to the selected message channel by means of the stepper switch.

2. In a communication system having a calling channel and a plurality of message channels, a receiver having a decoder responsive to received signals for producing an acquisition signal followed by a group of pulses corresponding to a selected one of the message channels; means in the decoder for producing an elongated pulse extending at least throughout the duration of the group of pulses; a channel selector including a stepper switch having a drive means, means responsive to the acquisition signal connected with the stepper switch to move the stepper switch to ready position, an index relay connected with the decoder output energized by the elongated pulses, a pulsing relay connected to the decoder output and the index relay energized by the group of pulses only when the index relay is energized, contacts on the pulsing relay connected to the drive means for initiating movement of the stepper switch throughout one position each time the pulsing relay is energized to thereby move the stepper switch to a position corresponding to the selected message channel, a control relay connected to the index relay initially energized therethrough upon energization thereof, a holding circuit for the control relay through the stepper switch when the stepper switch is in its message channel selection position, a plurality of channel indicating lamps each associated with a different channel and selected by the stepper switch, an indicating circuit energized upon termination of the elongated pulse comprising a circuit path through contacts of the energized control relay the selected channel indicating lamp and the stepper switch, a manually controlled hook switch, a hook switch relay in circuit with the hook switch energized upon closing of the hook switch, and contacts on the hook switch relay effecting tuning of the receiver to the calling channel when the hook switch relay is deenergized and effecting tuning of the receiver to the selected message channel by means of the stepper switch.

3. In a communication system having a calling channel and a plurality of message channels; a receiver having a decoder responsive to received signals for producing an acquisition signal followed by a group of pulses corresponding to a selected one of the message channels; means in the decoder for producing an elongated pulse extending at least throughout the duration of the group of pulses, a channel selector including a stepper switch having a drive means, means responsive to the acquisition signal connected with the stepper switch to move the stepper switch to ready position, an index relay connected with the decoder output energized by the elongated pulses, a pulsing relay connected to the decoder output and the index relay energized by the group of pulses only when the index relay is energized, contacts on the pulsing relay connected to the drive means for initiating movement of the stepper switch throughout one position each time the pulsing relay is energized to thereby move the stepper switch to a position corresponding to the selected message channel, a control relay connected to the index relay initially energized therethrough upon energization thereof, a time delay relay, a holding circuit for the control relay through the time delay relay and through the stepper switch when the stepper switch is in its message channel selection position, an indicating circuit energized upon termination of the elongated pulse comprising a circuit path through contacts of the deenergized index relay contacts of the energized control relay a channel indicating lamp and the stepper switch, a hook switch, a hook switch relay in circuit with the hook switch energized upon manual closing of the hook switch, and contacts on the hook switch relay effecting tuning of the receiver to the calling channel when the hook switch relay is deenergized and effecting tuning of the receiver to the selected message channel by means of the stepper switch.

4. In a communication system having a calling channel and a plurality of message channels; a receiver having a decoder responsive to received signals for producing an acquisition signal followed by a group of pulses corresponding to a selected one of the message channels; means in the decoder for producing an elongated pulse extending at least throughout the duration of the group of pulses; a channel selector including a stepper switch having a drive means, means responsive to the acquisition signal connected with the stepper switch to move the stepper switch to ready position, a pulsing relay connected to the decoder output energized by the group of pulses only when the elongated pulse is received, contacts on the pulsing relay connected to the drive means for initiating movement of the stepper switch throughout one position each time the pulsing relay is energized to thereby move the stepper switch to a position corresponding to the selected message channel, a control relay means connected to the decoder output for energizing the control relay upon receipt of the elongated pulse, a holding circuit for the control relay through the stepper switch when the stepper switch is in its message channel selection position, an indicating circuit energized upon termination of the elongated pulse comprising a circuit path through contacts of the energized control relay and the stepper switch, signal means energized by the indicating circuit, a tuning relay connected to the stepper switch energized upon closing of a manually controlled switch, and contacts on the tuning relay effecting tuning of the receiver to the calling channel when the tuning relay is deenergized and effecting tuning of the receiver to the selected message channel by means of the stepper switch when the tuning relay is energized.

5. In a communication system having a calling channel and a plurality of message channels, a receiver having a decoder responsive to received signals for producing an acquisition signal followed by a group of pulses corresponding to a selected one of the message channels, a channel selector connected to the decoder including a selecting switch, means responsive to the acquisition signal and connected to the selecting switch to change the selecting switch to a starting state, a pulsing relay connected to the decoder output energized by the group of pulses, means responsive to the pulsing relay and in circuit therewith for changing the selecting switch to a new state each time the pulsing relay is energized to thereby change the selecting switch to a state corresponding to the selected message channel upon receipt of the group of pulses, a control relay, means connected to the decoder output for energizing the control relay upon receipt of at least some of the group of pulses, a holding circuit for the control relay through the selecting switch, an indicating circuit energized upon termination of the group of pulses comprising a circuit path through contacts of the energized control relay and the selecting switch, a tuning circuit connected to the selecting switch, and manually controlled switch means connected to the tuning circuit for effecting tuning of the receiver to the selected message channel.

6. In a communication system having a calling channel and a plurality of message channels, a receiver having a decoder responsive to received signals for producing an acquisition signal followed by a group of pulses corresponding to a selected one of the message channels, a channel selector connected to the decoder and including a selecting switch, means responsive to the acquisition signal and connected to the selecting switch for enabling the channel selector, means connected to the decoder output responsive to the group of pulses for changing of the selecting switch to a new state each time a pulse of the group is received to thereby change the selecting switch to a state corresponding to the selected message channel, a control relay, means connected to the decoder output for energizing the control relay upon receipt of the group of pulses, a holding circuit for the control relay through the selecting switch, an indicating circuit energized upon termination of the group of pulses comprising a circuit path through contacts of the energized control relay and the selecting switch, a tuning circuit connected to the selecting switch, and manually controlled switch means connected to the tuning circuit for effecting tuning of the receiver to the selected message channel.

7. In a communication system having a calling channel and a plurality of message channels, a receiver having a decoder responsive to received signals for producing an acquisition signal followed by a group of pulses corresponding to a selected one of the message channels, a channel selector connected to the decoder and including a selecting switch, means connected to the selecting switch responsive to the acquisition signal for enabling selector, the channel means connected to the decoder output and the selecting switch and responsive to the group of pulses for changing the selecting switch to a new state each time a pulse of the group is received to thereby change the selecting switch to a state corresponding to the selected message channel, a control relay, means connected to the decoder output for energizing the control relay upon receipt of the group of pulses, a holding circuit for the control relay through the selecting switch, and an indicating circuit energized upon termination of the group of pulses comprising a circuit path through contacts of the energized control relay and the selecting switch.

8. In a communication system having a calling channel and a plurality of message channels, a receiver having a decoder responsive to received signals for producing an acquisition signal followed by a group of pulses corresponding to a selected one of the message channels, a channel selector connnected to the decoder and including a selecting switch, means connected to the selecting switch responsive to the acquisition signal for enabling the channel selector, a pulsing relay connected to the decoder output and the selecting switch energized by the group of pulses for changing the selecting switch to a new state each time the pulsing relay is energized to thereby change the selecting switch to a state corresponding to the selected message channel, a tuning circuit connected to the selecting switch and manually controlled switch means connected to the tuning circuit for effecting tuning of the receiver to the selected message channel.

9. In a communication system having a calling channel and a plurality of message channels, a receiver having a decoder responsive to received signal for producing an acquisition signal followed by a group of pulses corresponding to a selected one of the message channels, a channel selector connected to the decoder and including a selecting switch, means connected to the selecting switch responsive to the acquisition signal for enabling the channel selector, a pulsing relay connected to the decoder output and the selecting switch energized by the group of pulses for changing the selecting switch to a new state each time the pulsing relay is energized to thereby change the selecting switch to a state corresponding to the selected message channel, and means connected to the selecting switch for effecting tuning of the receiver to the selected message channel.

10. In a communication system having a calling channel and a plurality of message channels, a receiver having a decoder responsive to received signals for producing an acquisition signal followed by a group of pulses corresponding to a selected one of the message channels, a channel selector connected to the decoder and including a selecting switch, means connected to the selecting switch responsive to the acquisition signal for enabling the channel selector, means connnected to the decoder output and the selecting switch responsive to the group of pulses for changing the selecting switch to a new state each time one of the group of pulses is received to thereby change the selecting switch to a state corresponding to the selected message channel, and means connected to the selecting switch for effecting tuning of the receiver to the selected message channel.

References Cited by the Examiner

UNITED STATES PATENTS

| | | | |
|---|---|---|---|
| 2,559,165 | 7/1951 | Molnar | 179—15 |
| 2,624,806 | 1/1953 | Wright et al. | 179—15 |
| 3,077,577 | 2/1963 | Malone et al. | 179—84 |
| 3,087,999 | 4/1963 | Stewart et al. | 179—84 |

DAVID G. REDINBAUGH, *Primary Examiner.*

T. G. KEOUGH, R. L. GRIFFIN, *Assistant Examiners.*